United States Patent [19]

Calvani et al.

[11] Patent Number: 4,817,206

[45] Date of Patent: Mar. 28, 1989

[54] OPTICAL-FIBER TRANSMISSION SYSTEM WITH POLARIZATION MODULATION AND HETERODYNE COHERENT DETECTION

[75] Inventors: Riccardo Calvani; Renato Caponi; Francesco Cisternino, all of Turin, all of Italy

[73] Assignee: Cselt- Centro Studi e Laboratori Telecomunicazioni S.P.A., Turin, Italy

[21] Appl. No.: 35,623

[22] Filed: Apr. 3, 1987

[30] Foreign Application Priority Data

Apr. 10, 1986 [IT] Italy ................... 67291 A/86

[51] Int. Cl.⁴ ............................................. H04B 9/00
[52] U.S. Cl. ....................................... 455/616; 455/610;
455/617; 455/619; 329/144
[58] Field of Search ............... 455/616, 609, 610, 611,
455/612, 619, 617; 370/2; 372/27; 329/144

[56] References Cited

U.S. PATENT DOCUMENTS 3,191,047  6/1965  Oliver ........................... 329/144
3,426,207  2/1969  Fried et al. ..................... 455/611

FOREIGN PATENT DOCUMENTS 0013434  1/1984  Japan ........................... 370/2
0122140  7/1984  Japan ........................... 370/2
0047524  3/1985  Japan ........................... 455/619
0172842  9/1985  Japan ........................... 455/619
0023121  1/1986  Japan ........................... 455/616

OTHER PUBLICATIONS

David Smith, "Coherent Fiberoptic Communications", Laser Focus/Electro Optics, Nov. 1985, pp. 92–106.
T. Okoshi et al., "Computation of Bit-Error Rate"..., Journal of Optical Communications, 1981, pp. 89–96.

Primary Examiner—Robert L. Griffin
Assistant Examiner—Andrew J. Telesz, Jr.
Attorney, Agent, or Firm—Herbert Dubno

[57] ABSTRACT

Optical-fiber transmission system with heterodyne coherent detection in which, at the transmitting side, the polarization of an optical carrier is modulated, and at the receiving side the beam resulting from a combination of the modulated beam and a beam emitted from a local oscillator is split into two orthogonally-polarized components. The two optical signals are detected and sent to an electronic mixer which receives the two components and carries out a synchronous demodulation eliminating the effects of the linewidth of the source and of the local oscillator.

5 Claims, 1 Drawing Sheet

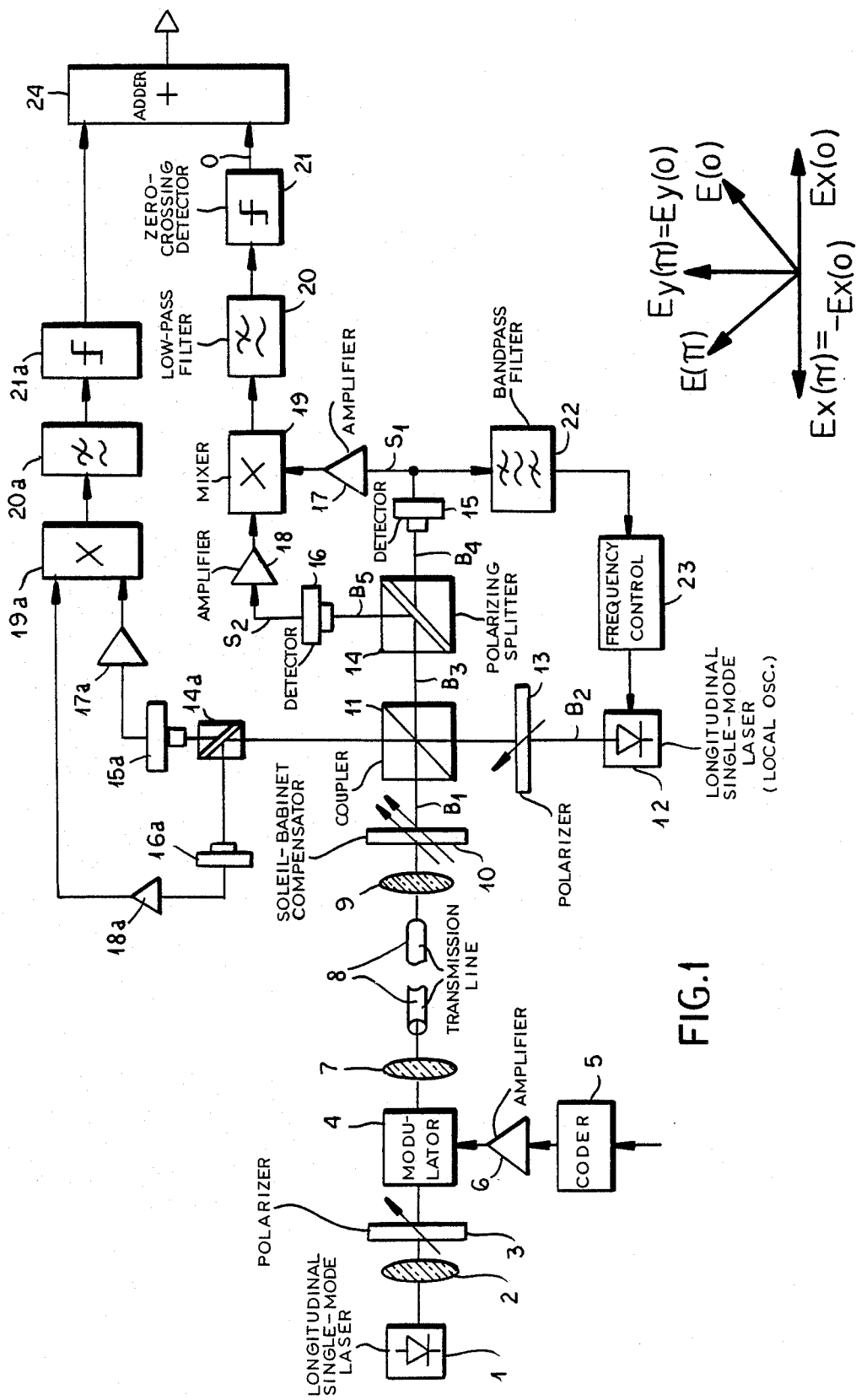

OPTICAL-FIBER TRANSMISSION SYSTEM WITH POLARIZATION MODULATION AND HETERODYNE COHERENT DETECTION

FIELD OF THE INVENTION

Our present invention relates to an optical-fiber communication system and, more particularly, to a transmission system with polarization modulation and heterodyne coherent detection.

BACKGROUND OF THE INVENTION

Transmission systems with homodyne or heterodyne detection (hereinafter referred to, as a whole, as coherent communication systems) are already well known in radio-frequency communications, and can be used in optical communications, especially at long wavelengths such as those comprised within the so-called second or third transmission windows (1.3–1.6 $\mu$m). In fact, at these wavelengths direct-detection system performance is limited by detector sensitivity (sensitivity is here defined as the minimum input power necessary to yield a predetermined error rate). Germanium detectors or detectors based on compounds of Periodic Table Group III and Group V elements are intrinsically more noisy than silicon detectors which can be utilized in the first window.

By contrast, coherent communication systems allow a sensitivity close to the limits due to quantum noise in photoelectric conversion. By conversion of the optical carrier into radio-frequencies, the selectivity of electronic filters can be used in optical transmissions, thus allowing a more complete exploitation of the available fiber band in case of FDM (frequency division multiplex) communications.

Various optical-fiber coherent communication systems are already known, which use amplitude, frequency or phase or differential phase modulation. A comparative analysis of the performances of these systems with one another and with direct-detection systems has been made e.g. in the papers "Computation of Bit-Error-Rate of Various Heterodyne and Coherent-Type Optical Communication Schemes" by T. Okoshi, K. Emura, K. Kikuchi, R.Th. Kersten, *Journal of Optical Communications*, Vol. 2 (1981), N.3, pages 89–96, and "Coherent Fiberoptic Communications" by D.W. Smith, *Laser Focus/Electro-Optics*, November 1985, pages 92–106. These analyses show that the best performance as to sensitivity is obtained by phase-modulation systems, followed by frequency and amplitude modulation systems. All these systems, as already mentioned, have better performance than direct detection systems.

Yet, the coherent systems suggested till now require, as light sources, lasers with an extremely narrow line to limit phase noise or detection. The higher the sensitivity required, the more stringent the linewidth constraints. More particularly, for frequency or amplitude modulation systems the linewidth cannot exceed 20% of the bit rate used for transmission, while for phase modulation systems the linewidth required is of the order of some thousandths of the bit rate.

At the bit rates nowadays obtainable without considerable difficulties, these requirements cannot be met by commercially available semiconductor-lasers. Sources are described in the literature such as the so-called distributed feedback (DFB) or distributed Bragg reflector (DBR) lasers, with linewidth characteristics which render them usable for amplitude or frequency modulation transmissions. Such sources are not yet commercially available.

Sources with the linewidths necessary to phase modulation transmissions, at bit rates of practical interest, are obtained by coupling a semiconductor laser with an external cavity. However, these are laboratory solutions, since such sources are too complicated, of low reliability and too difficult to handle for field use.

OBJECTS OF THE INVENTION

It is the principal object of the invention to provide an improved optical-fiber transmission system which overcomes the afore-described drawbacks.

Another object of our invention is to provide an improved coherent transmission system wherein the type of modulation and the modalities of detection allow considerable reduced constraints for source linewidth, so that good performance is obtained at a bit rate of practical interest by the use of commercially available sources.

SUMMARY OF THE INVENTION

These objects and others which will become apparent hereinafter are attained with an optical-fiber transmission system based, at the transmitting end, on a polarization modulation. At the receiving end, after the mixing with the local oscillator at different frequency (heterodyning), a polarization splitting of the beat signal as well as a detection with two separate photodiodes is performed. The two electrical signals, to which the phase noise of the source and of the local oscillator is superimposed, are mixed together. In this process phase noise is cancelled so that only the transmitted phase information remains.

More particularly, the coherent optical-fiber transmission system of the invention comprises a source of a light radiation at a first frequency and a modulator receiving an information signal and modulating by such a signal the radiation emitted by the source and sending the modulated signal onto the fiber forming the transmission line.

A device combines the modulated signal outgoing from the fiber with a second light radiation emitted by a local oscillator and having a frequency slightly different from that of the first radiation.

Means is provided for demodulating the signal resulting from the combination.

According to the invention, the source and the local oscillator are longitudinal monomode lasers which generate linearly-polarized light radiations.

The modulator is a modulator wherein the birefringence state is modified by the modulating signal, so that the modulated signal is a polarization-modulated signal.

The demodulating means comprise at least a polarization separating device which separates the signal resulting from the combination into two orthogonally-polarized components, which are separately converted into electrical signals and are supplied to a mixer, performing a synchronous demodulation cancelling phase noise due to the linewidth of the source and of the local oscillator.

The system can also comprise a compensator associated with an automatic control system with feedback, inserted between the fiber and the combining device to compensate variations in the polarization states of the modulated signal introduced by the fiber and variations in time of the birefringence of the fiber.

The combining device can generate two basically equal output beams and the demodulation can comprise a polarization separating device, a pair of detectors and a mixer for each outgoing beam, the output signals of the mixers being added together.

The system can also comprise a device for automatic control of the frequency of the local oscillator driven by the electrical signal resulting from the conversion of one of the combined signal components.

BRIEF DESCRIPTION OF THE DRAWING

The above and other objects features and advantages of the present invention will become more readily apparent from the following description reference being made to the accompanying drawing in which:

FIG. 1 is a schematic representation of the system of the invention; and

FIG. 2 is a vector diagram which shows the field of the states of polarization of the information relevant to reference system axes.

SPECIFIC DESCRIPTION

In the drawing, thin lines denote the optical-signal path and heavier lines denote the electrical signal path.

As shown, the signal outgoing from a longitudinal single-mode semiconductor laser 1 is collimated by an optical system 2 and passed into a polarizer 3, which linearly polarizes the radiation outgoing from the laser or improves its linear polarization. The polarized radiation is sent to a modulator 4 (e.g. an electro-optical or Faraday-effect modulator) whose birefringence state is modified by a modulating electrical signal (data signal). Said signal, which for simplicity sake is considered as a binary signal, is supplied by a coder 5 through an amplifier 6, which raises the signal level to the values necessary to drive the modulator 4.

The relative orientation of modulator birefringence axes with respect to laser radiation polarization must be such that the signal outgoing from modulator 4 presents two polarization states which can be easily distinguished.

As an example, the light emitted from laser 1 may be polarized at 45° with respect to the fast and slow modulator axes, so that the beam outgoing from the modulator comprises two mutually orthogonally polarized radiations, characterized by electrical fields Ex, Ey with relative phase 0 and, corresponding to symbols 1 and 0 of data signal, respectively (see FIG. 2).

The radiation outgoing from the modulator, which is a polarization-modulated carrier, is coupled through an optical system 7 into a low birefringence single-mode fiber 8, at whose output the two polarization states, modified by the birefringence of fiber 8, are still present.

The fiber 8 must have low birefringence; otherwise, owing to the fiber lengths used for coherent systems (of the order of hundreds of Kms), the difference in propagation times between the two polarizations would render the system unusable.

The signal outgoing from fiber 8 is collected by an optical system 9 and sent into a compensator 10, e.g. a Soleil-Babinet compensator, which recovers the two mutually-orthogonal linear polarization states. The compensator can be associated with a polarization control system to compensate also for possible variations in time of the fiber birefringence. Such polarization control systems are widely described in the literature.

The compensated beam $B_1$ is combined, by means of an X coupler 11, with a second beam $B_2$, which is linearly polarized at 45° with respect to the reference axes, as shown in FIG. 2, where $E(0)$, $E(\pi)$ are the electric fields relevant to the polarization state, characterized respectively by phases O and $\pi$ and unitary amplitude ratio, and Ex and Ey are the above-mentioned field components.

The second beam $B_2$ is supplied by a local oscillator 12.

This oscillator 12 can also be a longitudinal single-mode semiconductor laser, operating at a frequency different from that of source 1, but having linewidth characteristics as similar as possible to those of source. The frequency difference ought to be greater that the linewidth so as to ensure the necessary spectrum separation. The local oscillator 12 is associated with a polarizer 13, having the same functions as polarizer 3.

The recombined signal $B_3$ is then analyzed in polarization. Taking into account that device 11 gives rise to two outgoing beams, comprising each the reflected fraction of one input beam and the transmitted one of the other, and vice versa, polarization analysis can be effected for both outgoing beams, so as to avoid power losses.

A simpler solution could be to use a coupler 11 with an unbalanced partition ratio (e.g. 90/10) to obtain an inversely proportional exploitation (10/90) of the local oscillator power. The drawing refers to the solution entailing the analysis on a single output beam of device 11.

Such an outgoing beam $B_3$ is sent to a polarizing beam splitter 14, e.g. a Glan-Taylor prism, with the separating plane of the two elements orthogonal to the drawing plane, i.e. to the incidence plane of beam $B_3$ from device 11. The radiation polarized according to axis x (beam $B_4$) and that polarized according to axis y (beam $B_5$) outgoing from prism 14 are converted by detectors 15, 16 into electrical signals $S_1$, $S_2$ which, through amplifiers 17, 18, are fed to the inputs of a mixer 19, performing a synchronous demodulation of the signal.

This operation is based on the fact that one of the two detected signals (the signal corresponding to field component Ex, FIG. 2) consists of the radio-frequency carrier which is phasemodulated by the information signal, while the other (corresponding to component Ey) contains the carrier alone. These two signals are multiplied in the mixer, thus resulting in the above-mentioned coherent demodulation.

Taking into account that the two transmitted symbols correspond to phases 0 and $\pi$, and that the signal outgoing from the mixer, after filtering away the high-frequency components, is proportional to the cosine of the phase, the detected signal is characterized by values $+1$ and $-1$, corresponding to symbols 1 and 0 of the modulating signal. A low-pass filter 20, located at the mixer output, delimits the signal base-band. A threshold circuit 21, in particular a zero-crossing detector, supplies the data signal or output 0.

As to the constraint relevant to frequency separation between the local oscillator and the source, such separation must be kept always greater than linewidth of oscillator and source, so as to allow the detection of the intermediate frequency produced by the heterodyne process.

Owing to the polarization analysis and the subsequent synchronous demodulation the most stringent constraint represented by the influence of the finite source linewidth on the bit frequency is eliminated. In fact, the two optical beat signals present at the output of polarizing beam splitter 14 contain, besides the information signal, the phase noise due to such a finite width. Since mixer 19 operates in a subtracting way on both signals, this noise is practically cancelled, leaving at the output the only information signal provided the two optical paths after separator 14 are identical. Therefore, as mentioned, since source linewidth does not affect bit frequency, a commercially available longitudinal single-mode laser can be used as the source without any necessity of transmitting at extremely high frequencies which are difficult to achieve.

It is also worth noting that a stringent frequency locking between source 1 and local oscillator 12 is unnecessary, since possible variations in the frequency difference between the two lasers equally affect the two mixed channels. Obviously, this holds as long as such variations do not raise the value of the frequency difference (intermediate frequency) beyond detector sensitivity bandwidth or, conversely, do not excessively lower the frequency difference so that the requirements of intermediate frequency detection are no longer met. However, whenever it is deemed convenient, it is always possible to extract a fraction of the output signal of one of the detectors (the one which contains no information symbol) by a bandpass filter 22 and feed it back to the local oscillator 12 by a conventional automatic frequency control system 23.

According to the invention, the coupler can be constructed and arranged to generate two substantially equal output beams which are fed to respective demodulating means with an adder being connected to the demodulating means for summing the outputs of the two demodulating means together. In this embodiment, the adder can be seen at 24 in FIG. 1 to receive the output of the demodulating means 21 previously described and a demodulating means 21a receiving its output from elements 14a through 20a which correspond to the elements 14 through 20 previously described for a respective second output beam.

Modifications of the system are possible without departing from the scope of the invention. More particularly, the two polarization states coding the binary signal may be non-orthogonal, so as to render the amplitude of the modulated and reference signal mutually independent.

Finally, the transmission system in the disclosed configuration can be used without variation for multi-level transmissions.

We claim:

1. A coherent optical-fiber transmission system, comprising:
   a longitudinal monomode laser source of linearly polarized light radiation at a first frequency;
   a modulator connected to said source and receiving said light radiation at said first frequency and modulating same with an information signal so that the birefringence state of said light radiation of said first frequency is modified by the modulating signal, thereby transmitting an optical polarization-modulated signal;
   an optical fiber transmission line receiving said optical polarization-modulated signal at an input end and outputting a transmitted modulated optical signal at an output end;
   a coupler operatively connected to said output end of said transmission line for combining said transmitted modulated optical signal with a second linearly polarized light radiation having a frequency slightly different from that of said first frequency to output a combined optical signal;
   a second longitudinal monomode laser source producing said second linearly polarized light radiation and connected to said coupler for delivering said second linearly polarized light radiation thereto; and.
   demodulating means connected to said coupler and receiving said combined optical signal and including a polarization separating device for separating said combined optical signal into two mutually orthogonally polarized optical components, said demodulating means including transducer means for separately converting said optical components into respective electrical signals, and a mixer connected to said transducer means for combining said electrical signals and performing a synchronous demodulation cancelling phase noise due to linewidth of said sources and producing an output representing information carried by said information signal.

2. The system defined in claim 1, further comprising a compensator associated with an automatic control circuit with feedback inserted between said output end of said line and said coupler to compensate for variations in polarization states of the signal transmitted along said line introduced by the fiber of said line and variations of the birefringence of the fiber with time.

3. The system defined in claim 1 wherein said coupler is constructed and arranged to generate two substantially equal output beams which are fed to respective demodulating means, and wherein an adder is connected to said demodulating means for summing the outputs of said demodulating means together.

4. The system defined in claim 1, further comprising a device for automatic control of the frequency of said second radiation connected to said second source and driven by an electrical signal resulting from conversion of one of the electrical signals formed by said transducer means.

5. A method of transmitting information, comprising the steps of:
   (a) generating light radiation of a first frequency with a longitudinal monomode laser source;
   (b) modulating said light radiation of said first frequency with an information signal so that the birefringence state of the light radiation of said first frequency is modified by the modulating signal, thereby outputting a polarization-modulated signal;
   (c) transmitting said polarization-modulated signal from an input end of an optical-fiber transmission line to an output end thereof to output a transmitted optical signal at said output end;
   (d) combining said transmitted optical signal with a second light radiation of a frequency slightly different from the first frequency and outputted by a second longitudinal monomode laser source, to produce a combined optical signal; and
   (e) demodulating said combined optical signal with a polarization splitting device to separate the combined optical signal into two orthogonally-polarized optical components and converting each of said components into a respective electrical signal, and mixing said electrical signals while performing a synchronous demodulation, cancelling phase noise due to linewidth of said sources to produce an output signal representing information carried by said information signal.

* * * * *